United States Patent
Lee

(10) Patent No.: US 7,817,920 B2
(45) Date of Patent: Oct. 19, 2010

(54) SHORT-DISTANCE COMMUNICATION METHOD AND APPARATUS USING VISIBLE LIGHT

(75) Inventor: Kyung-Woo Lee, Yongin-si (KR)

(73) Assignee: Samsung Electronics Co., Ltd., Maetan-Dong, Yeong Tong-Gu, Suwon-Si, Gyeonggi-Do (KR)

( * ) Notice: Subject to any disclaimer, the term of this patent is extended or adjusted under 35 U.S.C. 154(b) by 537 days.

(21) Appl. No.: 11/975,504

(22) Filed: Oct. 19, 2007

(65) Prior Publication Data

US 2008/0095533 A1    Apr. 24, 2008

(30) Foreign Application Priority Data

Oct. 20, 2006   (KR) ............................. 102296/2006

(51) Int. Cl.
   *H04B 10/00* (2006.01)
   *H04J 14/02* (2006.01)
(52) U.S. Cl. ...................... 398/172; 398/34; 398/38; 398/94; 398/120
(58) Field of Classification Search .................. 398/34, 398/38, 94, 120, 172; 250/214 AL, 214 B
   See application file for complete search history.

(56) References Cited

U.S. PATENT DOCUMENTS 5,051,768 A * 9/1991 Harrison ..................... 396/157

FOREIGN PATENT DOCUMENTS

KR    2001-71931    7/2001

* cited by examiner

*Primary Examiner*—Leslie Pascal
(74) *Attorney, Agent, or Firm*—Cha & Reiter, LLC

(57) ABSTRACT

Disclosed is a short-distance communication method and an apparatus using visible light. The apparatus scans ambient light, measures optical power of visible light, among visible light included in the ambient light, having a wavelength corresponding to a transmission wavelength used for the visible light communication, compares a minimum transmission optical power of transmitted light, a real transmission optical power, and the measured optical power of the ambient light, selects a transmission wavelength of the transmitted light on which noises caused by the ambient light have little effect, and performs the visible light communication using the visible light of the selected transmission wavelength.

8 Claims, 5 Drawing Sheets

SHORT-DISTANCE COMMUNICATION METHOD AND APPARATUS USING VISIBLE LIGHT

CLAIM OF PRIORITY

This application claims priority to an application entitled "Short-Distance Communication Method And Apparatus Using Visible Light" filed in the Korean Intellectual Property Office on Oct. 20, 2006 and assigned Serial No. 2006-102296, the contents of which are hereby incorporated by reference.

BACKGROUND OF THE INVENTION

1. Field of the Invention

The present invention relates to a short-distance communication using visible light, and more particularly to a short-distance communication method and an apparatus using visible light that reduce noise caused by ambient light.

2. Description of the Related Art

Short-distance communication using a wireless terminal is generally achieved using infrared light. A wireless communication system using infrared light is usually used in Peer to Peer (P to P) communication, wherein each wireless terminal includes an infrared light transceiver mounted on the terminal. This type of terminal have a transmitter including a Light Emitting Diode (LED) for carrying out infrared light transmission and a light modulator, and a receiver including a Photo Diode (PD) and a demodulator.

The infrared light communication is processed at several Mbps and thus takes a long time to transmit contents. In addition, it is difficult to make an infrared light connection due to a close proximity requirement between terminals. Currently, the beam divergence of a transmitter specified by the Standards Organization is 30 degrees. If a beam divergence is away from the specified value, a normal communication using infrared light cannot be accomplished. To this end, short-distance communication systems using visible light have been developed.

Normally, conventional infrared light communication has disadvantages in that it is difficult for users to make an infrared light connection because it has a narrow beam divergence for an infrared light connection, and also there is no means for checking if an infrared light connection is made or not during operation. However, in Visible Light Communication (VLC) using visible light, it is possible to make a connection link easily by virtue of a broad transmission angle of a transmitter and to confirm the connection by virtue of the visible light. Accordingly, it is expected that a system using visible light will dominate the short-distance communication systems in the future. In order to make a wireless terminal support such a short-distance communication system using the visible light, it is necessary to provide a wireless terminal with a transceiver to achieve a short-distance communication using visible light.

In the short-distance communication using visible light, the most difficult problem is to remove noise caused by ambient light. Although visible light communication uses three wavelengths corresponding to green, blue, and red, the ambient light acts as noise.

SUMMARY OF THE INVENTION

Accordingly, the present invention has been made to solve the above-mentioned problems occurring in the prior art and provides additional advantages, by providing a short-distance communication method and an apparatus using visible light capable of minimizing noise caused by ambient light.

Another aspect of the present invention is to provide a short-distance communication method and apparatus using visible light efficiently.

In one embodiment, there is provided a method for short-distance communication using visible light in a communication terminal in which multiple wavelengths of the visible light used for the short-distance communication are set up as transmission wavelengths, the method includes the steps of: scanning ambient light; detecting wavelengths of the visible light as the wavelengths of the ambient light from the ambient light, so as to make the wavelengths of the visible light correspond to the transmission wavelengths, and measuring optical power of the ambient light, the visible rays having the same wavelength as the transmission wavelength; comparing a minimum transmission optical power of transmitted light having the transmission wavelength with the measured optical power of the ambient light having the corresponding wavelength; comparing a real transmission optical power of the transmitted light with the measured optical power of the ambient light, if the measured optical power of the ambient light is greater than the minimum transmission optical power of the transmitted light having the corresponding wavelength; detecting a difference between the measured optical power of the ambient light, the ambient light having the measured optical power less than the real transmission optical power, and the real transmission optical power of the transmitted light, if the ambient light having the measured optical power less than the corresponding the real transmission optical power exists; and performing the short-distance communication by using the visible rays having the transmission wavelength corresponding to the difference of the optical power which is greater than a predetermined value.

BRIEF DESCRIPTION OF THE DRAWINGS

The above aspects, features and advantages of the present invention will be more apparent from the following detailed description taken in conjunction with the accompanying drawings, in which.

DETAILED DESCRIPTION OF THE PRESENT INVENTION

Hereinafter, embodiments of the present invention will be described with reference to the accompanying drawings.

Figure 1:
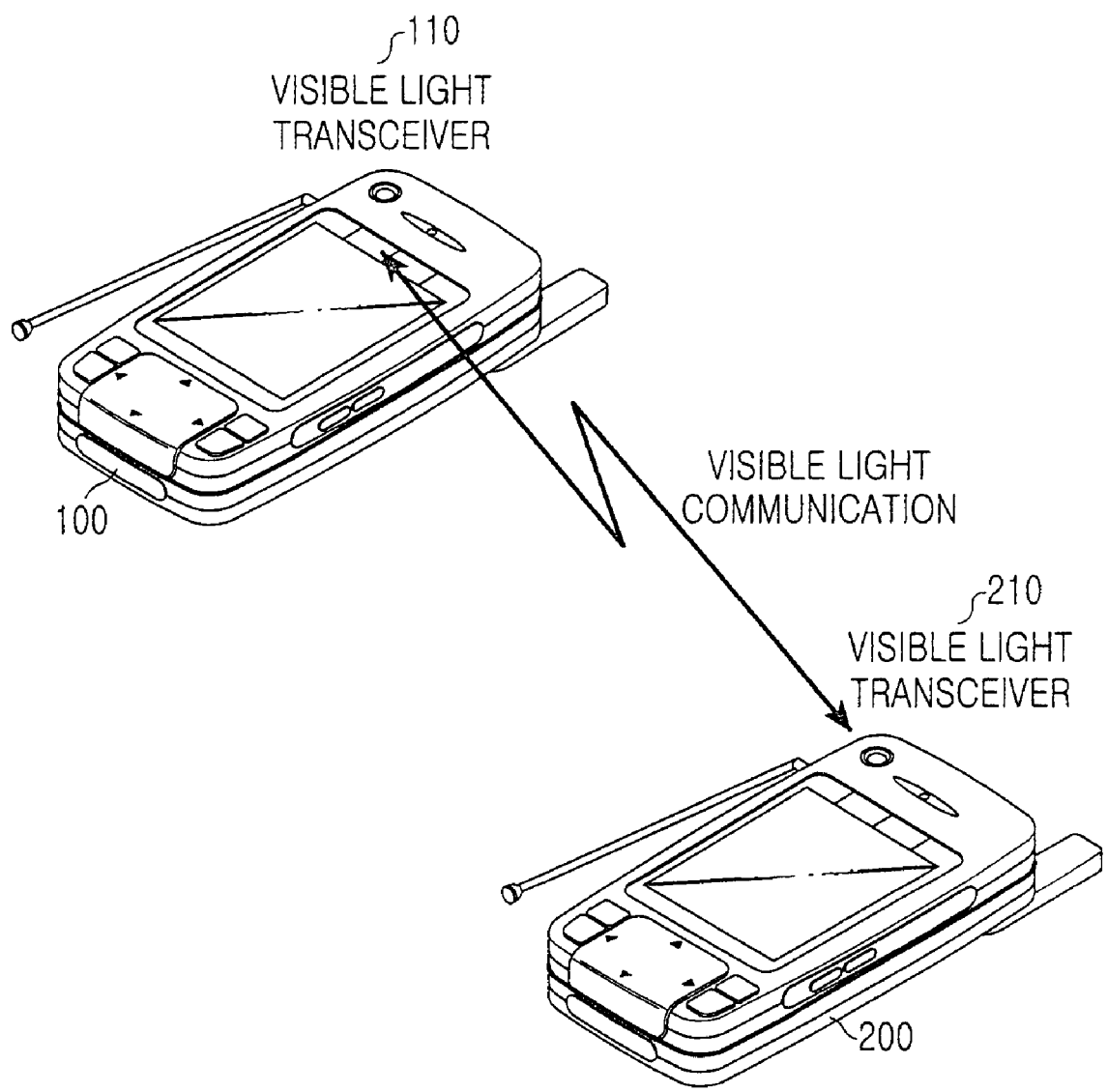
FIG. 1 illustrates the configuration of the first short-distance communication system using visible light, in which the present invention is employed.

FIG. 1 shows the configuration of the first short-distance communication system using visible light, in which the teachings of the present invention is applied. The first short-distance communication system shown in FIG. 1 includes communication terminals 100 and 200, which is a Peer to Peer (P to P) communication system between wireless terminals, and include visible light transceivers 110 and 210, respectively. The configuration of such a communication terminal 100 is shown in FIG. 2, which illustrates a configuration of the first short-distance communication terminal using visible light.

Figure 2:
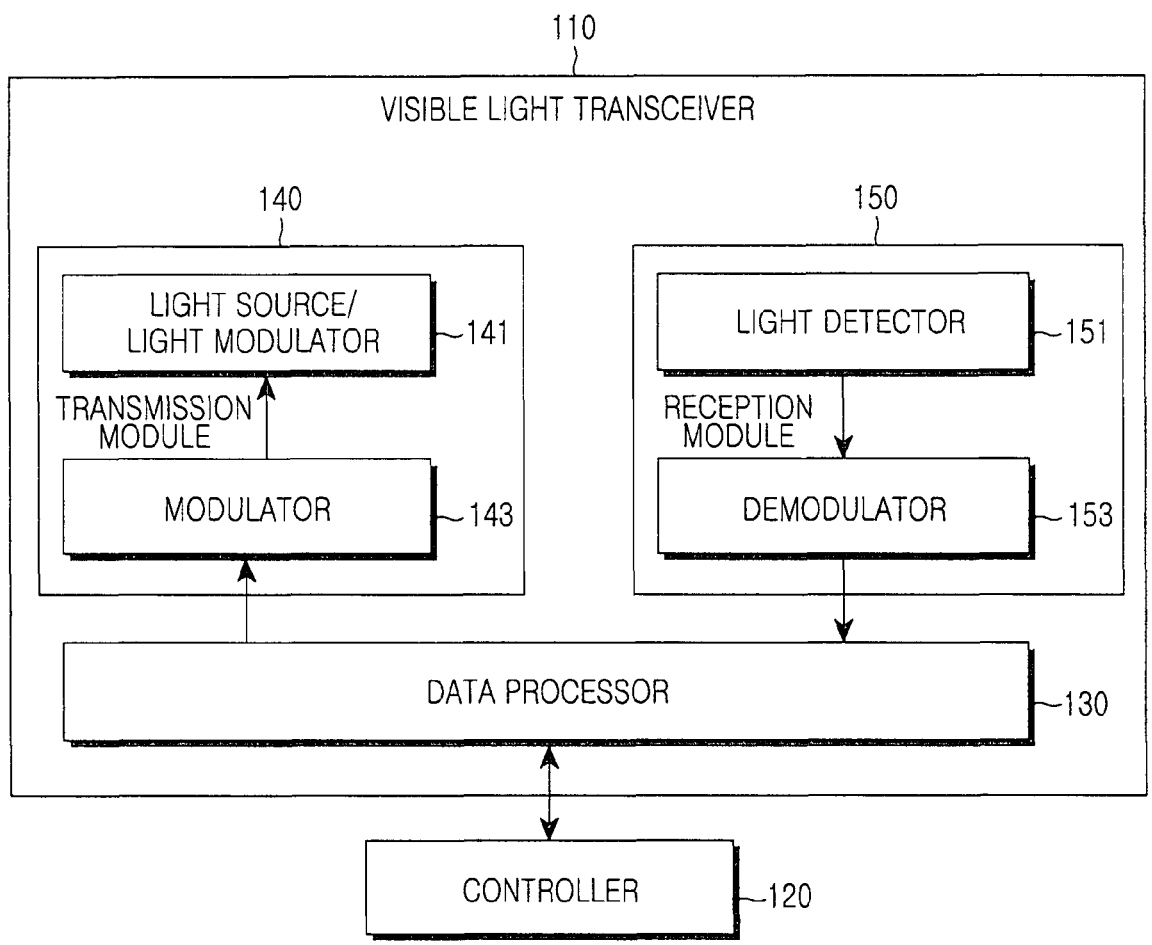
FIG. 2 illustrates the configuration of the first short-distance communication apparatus using visible light, in which the present invention is employed.

Referring to FIG. 2, the communication terminal 100 includes the visible light transceiver 110, a controller 120, a memory unit (not shown), a display unit (not shown), a key input unit (not shown), a baseband processor (not shown), a Radio Frequency (RF) module (not shown), a voice processor (not shown), etc. The controller 120 controls the overall operation of the communication terminal 100 and is linked with the memory unit, the display unit, the key input unit, the baseband processor, the Radio Frequency (RF) module, and the voice processor, so as to perform the mobile communication. Additionally, the controller 120 sets up a visible light communication mode depending on users' request, and controls the visible light transceiver 110. In the visible light communication mode, a short-distance communication is performed using visible light.

The visible light transceiver 110 performs a visible light communication and includes a transmission module 140, a reception module 150, and a data processor 130.

The transmission module 140 is a transmission device for providing a short-distance communication using visible light, and includes a modulator 143 for modulating data, transmitted through the data processor 130, to signals suitable for optical wireless communication, and a light source/light modulator 141 for optically modulating the modulated signals so as to transfer them to an external device through a light source. The light source may be, for example, an LED including a green LED, a red LED, and a blue LED.

The reception module 150 is a reception device for providing a short-distance communication using visible light, and includes a light detector 151 for detecting optical signals transmitted from the external device to convert them into electric signals, and a demodulator 153 for demodulating the electric signals, transmitted through the light detector 151, to data in an optical wireless communication way, and then outputting the data to the data processor 130. The light detector 151 may include, for example, photo diodes, each of which detects light having a specific wavelength. The data processor 130 processes both data for transmission and received data in short-distance communication using visible light.

According to an embodiment of the present invention, the visible light transceiver (110) performs the short-distance communication using a plurality of the visible lights having different wavelengths from each other. Accordingly, the data processor 130 stores, as the transmission wavelengths, each wavelength of a plurality of the visible light used for the short-distance communication. The data processor 130 stores the minimum transmissions optical power corresponding to each transmission wavelength. The minimum transmission optical power is directed to the minimum optical power of the visible light capable of transmitting the data in the visible light communication.

The transmission wavelengths can be determined according to the type of a light source LED included in the light source/light modulator 141. Further, the data processor 130 stores real output optical power according to the wavelengths of transmitted light in the short-distance communication. The real output optical power is set at a higher level than that of the minimum transmission optical power. The real transmission optical power, which is determined according to the type of the visible light corresponding to the each transmission wavelength, is directed to the optical power level used when the visible light transceiver transmits the data. As indicated earlier, the minimum transmission optical power is directed to the minimum optical power capable of transmitting the data. Accordingly, the real transmission optical power set up in the visible light transceiver has to be set up as greater than at least the minimum transmission optical power so that the visible light communication is performed.

Further, it is desirable that the real transmission optical power for comfortable communication is set up as greater than the minimum transmission optical power, within some extent, since the ambient light in the wireless environment may exist. Hence the optical power difference between the real transmission optical power and the minimum transmission optical power is usually determined by an experiment to obtain a desired result.

Now, the operation of the visible light transceiver 110 configured as described above, according to the present invention, will be described below.

When a visible light communication mode is set up according to the present invention, the light detector 151 of the visible light transceiver 110 collects and outputs ambient light to the data processor 130 through the demodulator 153.

The data processor (130) measures the optical power of the visible light having the same kind as at least one transmission wavelength used for short-distance communication by the visible light transceiver (110), among the visible light included in ambient light, and stores the optical power of the measured each visible light as the optical power of each ambient light wavelength. Then, the data processor (130) compares the minimum transmission optical power of the transmission wavelength corresponding to the ambient light wavelength and the real transmission optical power of the transmission wavelength with the optical power of the measured visible light, that is, the optical power of the ambient light wavelength. According to the result of the comparison, the data processor (130) selects the transmission wavelength which is the most suitable for short-distance communication and performs short-distance communication by using the selected transmission wavelength. That is, the most suitable transmission wavelength for short-distance communication is selected as transmission wavelength having the largest difference between the real transmission optical power of the transmission wavelength and the measured optical power of ambient light wavelength corresponding to the transmission wavelength.

Figure 3:
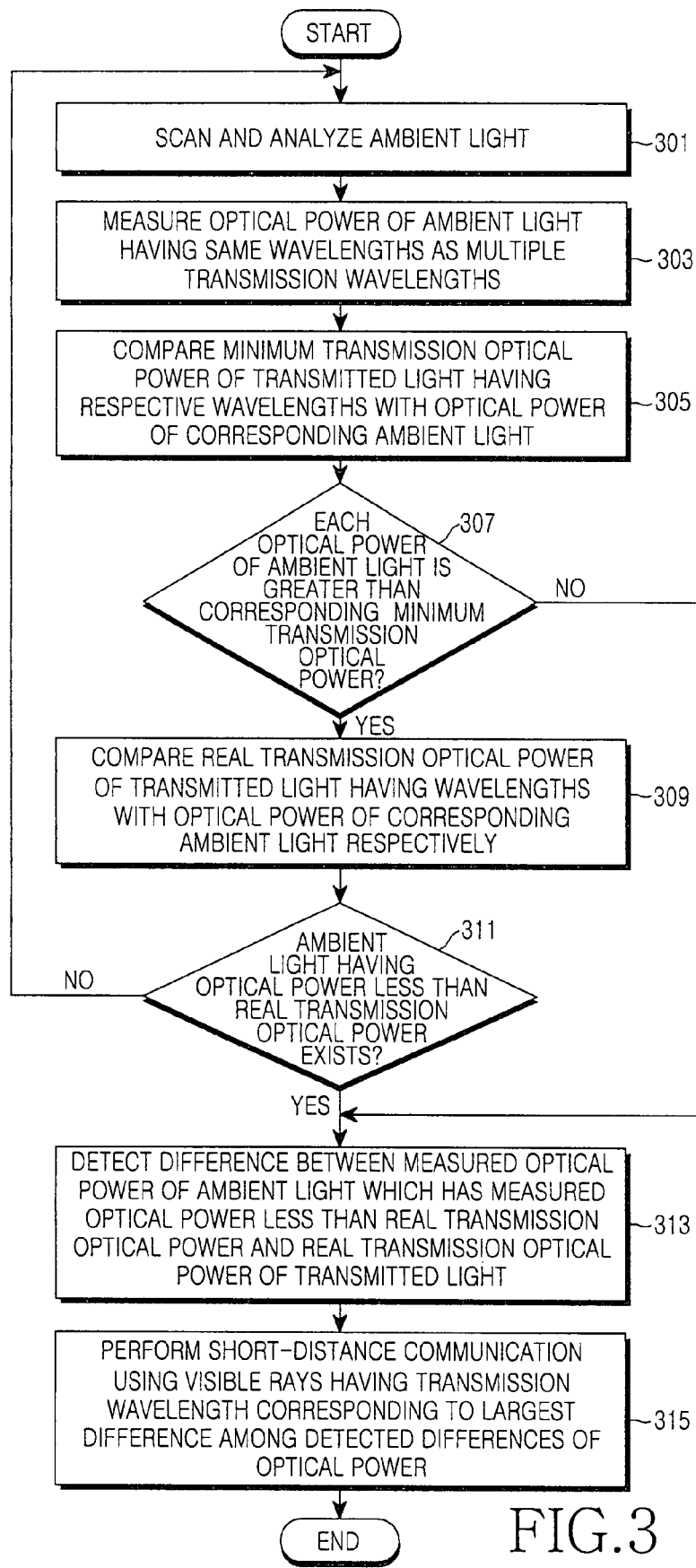
FIG. 3 is a flow chart showing steps of performing short-distance communication using visible light according to an embodiment of the present invention.

As described above, the operation of the visible light transceiver 110 is shown in FIG. 3.

FIG. 3 shows the steps of performing a short-distance communication using visible light according to an embodiment of the present invention. Referring to FIG. 3, the visible light transceiver 110 scans and analyzes ambient light in step 310, and proceeds to step 303. In step 303, the visible light transceiver 110 measures the optical power of ambient light wavelengths having the same wavelengths as multiple transmission wavelengths set previously in the data processor 130, and proceeds to step 305. In step 305, the visible light transceiver 110 compares all the minimum transmission optical power of transmission wavelengths with the measured optical power of ambient light wavelengths each corresponding to the transmission wavelength, and proceeds to step 307.

In step 307, the visible light transceiver 110 determines if the optical power of all ambient light wavelength are greater than the minimum transmission optical power of the transmission wavelength each corresponding to the transmission wavelength. If the optical power of ambient light wavelength corresponding to a certain transmission wavelength is greater than the minimum transmission optical power of the certain transmission wavelength, the probability of noise occurrence caused by the ambient light increases significantly. Therefore, the communication can improved by using the transmission wavelengths corresponding to those of the ambient light wavelengths having optical power less than the minimum transmission optical power of the transmission wavelengths.

If the optical power of the ambient light wavelengths are greater than the minimum transmission optical power of the transmission wavelengths in step 307, the visible light transceiver 110 proceeds to step 309, compares the real transmission optical power of the transmission wavelength with the optical power of the ambient light wavelength, and identifies if ambient light wavelength having optical power less than the real transmission optical power exists. If the ambient light wavelength having optical power less than the real transmission optical power does not exist, particularly, if optical power of the ambient light wavelengths are greater than the real transmission optical power of the transmission wavelength each corresponding to the ambient wavelength, it is impossible to perform a short-distance communication. In a case where short-distance communication is performed under such environment, there is a possibility of data loss. Accordingly, the visible light transceiver 110 proceeds to step 301, scans ambient light again, and performs steps 301 to 311 repeatedly until wireless environment becomes better.

However, in step 311, if ambient light wavelength having optical power less than real transmission optical power exists, the visible light transceiver 110 proceeds to step 313, detects difference between the real transmission optical power of the respective transmission wavelengths corresponding to that of the ambient light wavelengths and the optical power of the respective ambient light wavelengths, and proceeds to step 315. In step 315, the visible light transceiver 110 performs a visible light communication using the transmission light having the wavelength corresponding to the largest optical power difference which is detected in step 313. In visible light having a certain transmission wavelength, as the difference between the optical power of ambient light wavelength corresponding to the certain transmission wavelength and the real transmission optical power of the certain transmission wavelength increases, it is possible to obtain a more stable communication quality when the short-distance wireless communication is performed by using visible light having the certain transmission wavelength.

Figure 4:
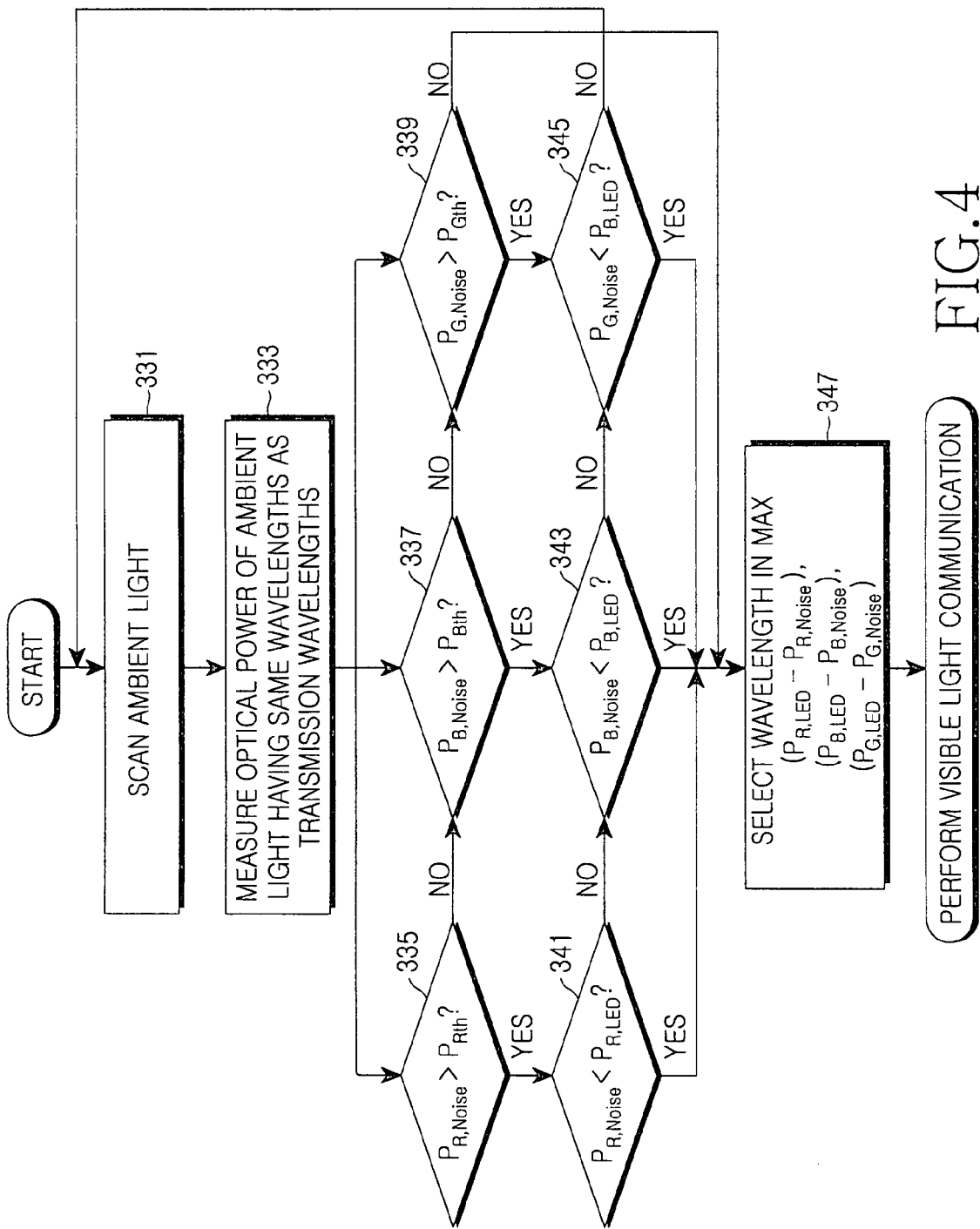
FIG. 4 is a flow chart showing steps of short-distance communication using visible light according to another embodiment of the present invention.

Meanwhile, as a result of identification in step 307, if the ambient light wavelength has optical power less than corresponding minimum transmission optical power, the visible light transceiver 110 proceeds to step 313, detects difference between the real transmission optical power of the respective transmission wavelengths corresponding to that of the ambient light wavelengths and the optical power of the respective ambient light wavelengths, proceeds to step 315, and performs the visible light communication by using visible light having the transmission wavelength corresponding to the largest optical power difference In a case where the transmission wavelength used for a visible light communication is wavelength of red light, wavelength of green light, or wavelength of blue light, the operation of the visible light transceiver 110, according to the steps of the FIG. 3, is shown in FIG. 4 in detail. Here, minimum transmission optical power of the red light is shown as $PR_{th}$, real transmission optical power is shown as $P_{R,LED}$, minimum transmission optical power of visible light of blue wavelengths for transmission is shown as $PB_{th}$, real transmission optical power is shown as $P_{B,LED}$, minimum transmission optical power of visible light of green wavelengths is shown as $PG_{th}$, real transmission optical power is shown as $P_{G,LED}$. The measured optical power of ambient light wavelength corresponding to the red light, particularly red light of ambient lights, is shown as $P_{R,Noise}$, measured optical power of blue ambient light wavelengths, particularly blue visible light, is shown as $P_{B,Noise}$, and measured optical power of ambient light of green wavelengths, particularly green visible light, is shown as $P_{G,Noise}$.

Referring to FIG. 4, the visible light transceiver 110 scans ambient light, and proceeds to step 333. In step 333, the visible light transceiver 110 measures optical power of ambient light having the same wavelengths as transmission wavelengths. Particularly, the visible light transceiver 110 measures the optical power of ambient light of red wavelengths, of blue wavelengths, and of blue wavelengths, respectively.

Then, the visible light transceiver 110 proceeds to steps 335, 337, and 339, and compares minimum transmission optical power of red transmission wavelength red, transmission wavelength blue, and green transmission wavelength with the measured optical power of the ambient light of red, blue, and green wavelengths, respectively.

As result of the comparison, if the measured optical power of the ambient light of having corresponding wavelengths are greater than the minimum transmission optical power of the transmitted light of corresponding the ambient light wavelengths, the visible light transceiver 110 proceeds to steps 341, 343, and 345, and compares the real transmission optical power of transmitted light of red, blue, and green transmission wavelengths with the measured optical power of ambient light of red, blue, and green wavelengths, respectively.

As result of the comparison, if the measured optical power of the ambient light wavelength is greater than the real transmission optical power of the transmitted light having corresponding the ambient light wavelengths, the visible light transceiver 110 proceeds to step 331, and scans ambient light again. However, as result of comparison, if the ambient light having measured optical power less than the real transmission optical power of transmitted light exists, the visible light transceiver 110 proceeds to step 347, and detects a difference between the measured optical power of the ambient light and the real transmission optical power of transmitted light having the corresponding the ambient light wavelength. And, the visible light transceiver 110 performs visible light communication by using transmitted light having the wavelength corresponding to the largest optical power difference.

Figure 5:
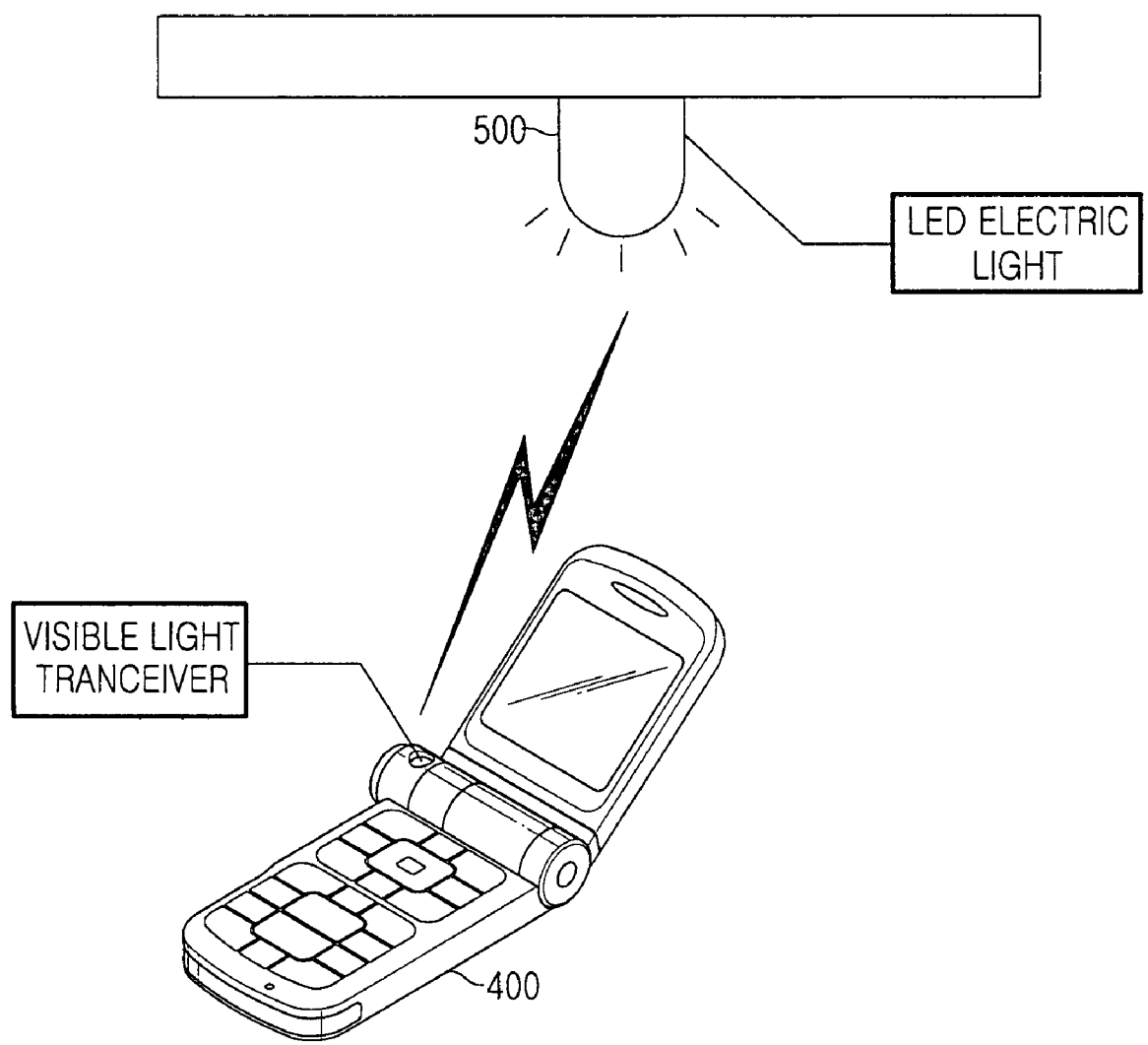
FIG. 5 illustrates the configuration of the second short-distance communication system using visible light, in which the present invention is employed.

As described above, the present invention scans ambient light, measures the power of visible light having a wavelength, among wavelengths of visible light, corresponding to a transmission wavelength used for visible light communication, compares between minimum transmission optical power of transmitted light, real transmission optical power, and the measured optical power of the ambient light, selects a transmission wavelength of the transmitted light which can be under less influence of noise caused by ambient light, and performs visible light communication by using visible light having the selected transmission wavelength. Although, in the embodiment as described above, the visible light communication is performed by using the transmitted light having the wavelength corresponding to the largest optical power difference between the real transmission optical power of the transmitted light and the measured optical power of the ambient light having the corresponding wavelength, it can be easily understood by those skilled in the art that it is also possible that all transmission wavelengths of the transmitted light having difference in optical power which is over a predetermined value, are selected to perform visible light communication. In other words, if the difference between the real transmission optical power of the transmitted light and the measured optical power of the ambient light having a wavelength corresponding to the transmission wavelength is over a predetermined value, visible light communication is performed by using visible light having selected corresponding transmission wavelength. Thus, it can improve the communication quality to perform visible light communication by selecting rather a transmission wavelength satisfied with a condition described above than multiple transmission wavelengths satisfied with that condition. If, as shown in FIG. 5, a communication terminal 400 receives data from a LED electric light 500 one-sidely through the visible light, it can be configured in order to demodulate only data transmitted through the visible light, among received visible light, having a corresponding wavelength satisfied with that condition.

Meanwhile, in a case where visible light communication is performed by using visible light having multiple transmission wavelengths, respectively, although it can be set up that same data are transmitted by using transmission wavelengths, it can also set up that different data are transmitted by using different visible light having different transmission wavelengths, respectively. Such like that, in the case that different data of respective different transmission wavelengths are transmitted, visible light communication can be performed by specifying target communication terminals, which are different from each other, corresponding to respective transmission wavelengths. Particularly, after selecting a target communication terminal for visible light communication and a transmission wavelength which will be used for visible light communication through steps of FIG. 3 or FIG. 4, the selected transmission wavelength is notified to the target communication terminal, and visible light having the notified wavelength is used for visible light communication between two terminals.

Although the visible light transceiver 110 for visible light communication is given as an example, the present invention may be employed for a communication terminal configured in order to perform visible light communication through the communication terminal having a camera. Korean Patent Application No. 2004-56593, filed on May 28, 2000 in the name of the present applicant, discloses visible light communication by using a communication terminal having a camera. While the invention has been shown and described with reference to certain exemplary embodiments thereof, it will be understood by those skilled in the art that various changes in form and details may be made therein without departing from the spirit and scope of the invention as defined by the appended claims.

The present invention as described above, in short-distance communication using visible light, can provide improved communication quality by minimizing the influence of noise caused by ambient light, and can perform communication efficiently.

What is claimed is:

1. A method for providing a short-distance communication using visible light in a communication terminal in which multiple wavelengths of the visible light used for the short-distance communication are set up as transmission wavelengths, the method comprising:
    scanning ambient light;
    measuring an optical power of each of the ambient light having same wavelength as the transmission wavelengths;
    comparing a minimum transmission optical power of the respective transmission wavelengths with the measured optical power of the ambient light having wavelength corresponding to the transmission wavelength;
    if the measured optical power of all the ambient light is greater than the minimum transmission optical power, comparing a real transmission optical power of the respective transmission wavelengths with the measured optical power of the ambient light having wavelength corresponding to the transmission wavelength;
    if the measured optical power is less than the corresponding the real transmission optical power, detecting a difference between the measured optical power of the ambient light and the real transmission optical power; and
    performing the short-distance communication using the visible light having the transmission wavelength corresponding to the largest detected difference among the detected differences of optical power.

2. The method as claimed in claim 1, further comprising: if the measured optical power of the ambient light is less than the corresponding minimum transmission optical power, detecting a difference between the measured optical power of the ambient light and the real transmission optical power corresponding to the ambient light; and
    performing the short-distance communication using the visible light having a transmission wavelength corresponding to the largest detected difference among the detected difference.

3. The method as claimed in claim 2, further comprising scanning ambient light again if each the measured optical power of the ambient light is greater than the corresponding the real transmission optical power corresponding to the wavelength of the ambient light.

4. The method as claimed in claim 1, wherein the minimum transmission optical power is less than the corresponding real transmission optical power.

5. An apparatus for providing a short-distance communication using visible light in a communication terminal, in which multiple wavelengths of the visible light used for the short-distance communication are set up as transmission wavelengths, the apparatus comprising:
    a light detector; and
    a data processor for detecting the wavelengths of the visible light as ambient light wavelengths from the ambient light, so as to make the wavelengths of the visible light correspond to the transmission wavelengths, for measuring optical power of the respective ambient light wavelengths, for comparing a minimum transmission optical power of the respective transmission wavelengths with the measured optical power of the corresponding ambient light wavelengths, for comparing real transmission optical power of the respective transmission wavelengths with the measured optical power of the corresponding ambient light wavelengths, if the measured optical power of all the ambient light wavelengths is greater than the corresponding minimum transmission optical power, for detecting a difference between the measured optical power of the respective ambient light wavelengths which has the measured optical power less than the corresponding real transmission optical power, and the corresponding real transmission optical power, if the measured optical power less than the corresponding the real transmission optical power exists, and for performing the short-distance communication by using visible light having the transmission wavelength corresponding to the largest detected difference among the detected differences of optical power.

6. The apparatus as claimed in claim 5, wherein the data processor detects a difference between the measured optical power of the ambient light wavelengths and the corresponding real transmission optical power if the measured optical power of the ambient light wavelength is less than the corresponding minimum transmission optical power, and performs the short-distance communication by using the visible light having the transmission wavelength corresponding to the largest detected difference among the detected difference.

7. The apparatus as claimed in claim 6, wherein the data processor scans ambient light again if the measured optical power of all the ambient light wavelengths are greater than each of the corresponding real transmission optical power.

8. An apparatus for providing a short-distance communication using visible light having a plurality of transmission wavelengths, comprising:
    a light detector configured to measure an optical power of an ambient light having same wavelength as the transmission wavelengths; and a data processor configured to: compare the measured optical power of all the ambient light to a pre-stored real transmission optical power having the respective corresponding transmission wavelengths; detect a difference between the measured optical power of the ambient light and the real transmission optical power when the measured optical power is less than the corresponding the real transmission optical power; and perform the short-distance communication using the visible light having the transmission wavelength corresponding to the largest detected difference among the detected differences of optical power.

* * * * *